US007880328B2

(12) United States Patent
Whyte

(10) Patent No.: US 7,880,328 B2
(45) Date of Patent: Feb. 1, 2011

(54) STAGE-FUSED TRANSFORMER LOOP SYSTEM AND METHOD OF RAPID DIAGNOSIS OF FAULT CABLE OR TRANSFORMER FAILURE WITHIN THE SYSTEM

(76) Inventor: Gregory P. Whyte, 104 Newton Rd., Hollywood, FL (US) 33023

(*) Notice: Subject to any disclaimer, the term of this patent is extended or adjusted under 35 U.S.C. 154(b) by 0 days.

(21) Appl. No.: 12/255,316

(22) Filed: Oct. 21, 2008

(65) Prior Publication Data

US 2009/0039894 A1 Feb. 12, 2009

Related U.S. Application Data

(62) Division of application No. 11/525,454, filed on Sep. 23, 2006, now Pat. No. 7,445,480.

(51) Int. Cl.
*H02J 3/00* (2006.01)
*H02H 7/04* (2006.01)
*H01R 13/68* (2006.01)

(52) U.S. Cl. .......................... 307/17; 361/38; 361/41; 439/250; 439/620.26; 439/881; 439/890; 439/893

(58) Field of Classification Search .................. 307/17, 307/83; 361/38, 41; 439/250, 620.26, 620.28, 439/620.3, 620.32, 854, 855, 881, 890, 893
See application file for complete search history.

(56) References Cited

U.S. PATENT DOCUMENTS 5,754,384 A * 5/1998 Ashley ...................... 361/93.9
5,854,730 A * 12/1998 Mitchell et al. ............... 361/38
6,491,548 B2 * 12/2002 Stepniak et al. ........ 439/620.28

* cited by examiner

*Primary Examiner*—Hal I Kaplan
(74) *Attorney, Agent, or Firm*—Yi Li

(57) ABSTRACT

A stage-fused underground transformer loop system, which includes a series of transformers connected sequentially by a series of cables, and a series of fused elbow terminators connected to the inlets and outlets of the transformers. The fused elbow terminators are arranged in an order of decreasing the fuse capacity starting from the feed. The fused elbow terminator includes an elbow connector having a housing and a cable connector disposed within; and a fused pin connected to the cable connector. Further disclosed is a method of rapid diagnosis of a fault cable or a transformer failure using the stage-fused transformer loop system.

11 Claims, 9 Drawing Sheets

STAGE-FUSED TRANSFORMER LOOP SYSTEM AND METHOD OF RAPID DIAGNOSIS OF FAULT CABLE OR TRANSFORMER FAILURE WITHIN THE SYSTEM

CROSS REFERENCE TO RELATED APPLICATION

This application is a divisional of patent application Ser. No. 11/525,454, filed Sep. 23, 2006, now U.S. Pat. No. 7,445,480 B2, which is hereby incorporated by reference in its entirety.

FIELD OF THE INVENTION

The present invention relates to a fused elbow terminator, a stage-fused underground transformer loop system, and a method of diagnosis of a fault cable or transformer failure by stage fusing a transformer loop system.

BACKGROUND OF THE INVENTION

Currently, in the United States the electrical power supply is most commonly provided using underground transformers. Typically, the transformers supplying power to an area are arranged into a loop system. One transformer loop system usually includes 8 to 50 transformers, and each transformer supplies power to 1 to 16 customers. Within the loop system, the transformers are sequentially connected one to another by a series of cables. Each cable is connected to the inlet of a transformer and the outlet of an immediate preceding transformer by two elbow terminators. The first and the last transformers are connected to a power source, such as an overhead power line. Within each loop system there is a normal open typically located at the middle of the loop system.

In operation, if a cable is fault, or a transformer has problem, a portion of or all transformers in the loop system will be out of service, and the customers will have power outage. The process of locating a fault cable or failed transformer is a time consuming and sometimes a very complex process. The time spent by the field investigators for locating the fault cable or failed transformer can be from 2 hours to 4 hours, depending on the size of the loop and the location of the fault. The lengthy power down time causes inconvenience to customers and financial loss to business.

To assist the diagnosis process, fault indicators have been used in the existing underground transformer loop system. The fault indicators are connected on to the cable right before the elbow terminator at the inlet of transformers. If a cable is faulty, or the fuse in a transformer is blown by overload current, or fault current, the fault current travels back toward the power source. The fault indicators connected to the transformers preceding the failed transformer or the fault cable will sense the fault current and show an abnormal reading or display a colored indicator. However, these fault indicators have been found not sensitive and their response is very unreliable. Furthermore, many existing loop systems do not have fault indicators installed, therefore, locating a fault cable or failed transformer frequently uses process elimination approach to gradually narrow down the possibilities.

To understand the difficulties associated with the existing diagnosis process, an example of locating a fault cable is provided. Assume an existing underground transformer loop system including 8 transformers (Tx1 to Tx8), each supplying 10 residential customers, therefore each transformer is more than two blocks away from the next transformer. The normal open is positioned at transformer Tx5. The problem is a fault cable between transformers Tx3 and Tx4. As the problem occurs, all customers supplied by transformers Tx1 to Tx5 are out of power supply, but the customers supplied by transformers Tx6 to Tx8 still have power as they locate on the other side of normal open.

As the customers call in to report power outage, an assigned trouble investigator needs first to verify that the lateral switch connected to the overhead power line before transformer Tx1 is open, which takes about 10 minutes because the lateral switch is commonly half a mile from the transformer loop. An open lateral switch means that the fuse in the lateral switch is blown by a fault current. The investigator reports to the dispatcher his findings, and the dispatcher checks the loop system layout on the computer and verifies how many transformers within the loop system are out of service, which takes about 5 to 10 minutes, if no other accrued services are pending. The dispatcher then instructs the trouble investigator to start working from the middle of the out of service portion using the process elimination approach. The investigator checks the fault indicators on transformers Tx1 to Tx5 if the transformers of this loop system have the fault indicators installed previously, otherwise, the investigator places fault indicators on each one of transformers Tx1 to Tx5. The investigator also replaces the blown fuse in the lateral switch. Then, the investigator closes lateral switch, at this time the fuse will be blown again by the fault current. Now the investigator checks the readings of the fault indicators, which should read normal at Tx4 and Tx5 because no fault current goes through them, and the fault indicators on transformers Tx1 to Tx3 should read high fault current, if the fault indicators respond properly. Then, the investigator disconnects (also called parks) the cable connected to the inlet of transformer Tx3, replaces the blown fuse in the lateral switch, then closes lateral switch again. If the fuse holds, it confirms that the problem is either a transformer failure of transformer Tx3, or a fault cable between transformers Tx3 and Tx4. These two steps typically take about 20 to 40 minutes. To determine whether the problem is a fault cable, or a transformer failure of transformer Tx3, the investigator disconnects cable connected to the outlet of transformer Tx3, reconnects the cable between transformers Tx2 and Tx3 to the inlet of transformer Tx3, and closes the lateral switch again. If the fuse holds, transformer Tx1, Tx2 and Tx3 are good. Therefore, the problem is a fault cable between transformers Tx3 and Tx4. This step typically takes about 15 to 30 minutes. At this time, the investigator can restore the power supply to transformers Tx4 and Tx5 prior to repairing the fault cable by disconnecting the cable connected to the inlet of transformer Tx4 and closing the normal open at transformer Tx5. The whole process of locating the fault cable described above can take about 2 to 4 hours, depending on the size of the loop system. Within this time the investigator has to drive among the transformers and to the lateral switch multiple times. Moreover, during this diagnosis test process, the lateral switch needs to be closed multiple times., Each time when the lateral switch is closed, it causes a fault current along a section of the loop system under the diagnosis test, which could cause further fault in cables or transformer failures due to the high level fault current. It is not uncommon that more cables and transformers are damaged during the process of the existing diagnosis process. As described above, this process utilizes the fault indicators to assist the diagnosis, and assumes that the fault indicators respond reliably. If the fault indicators are not used, or in the case when the response of the fault indicators is unreliable, the lateral switch needs to be closed even more. The diagnosis test process further lengthens, and potential damages to the cables and transformers due to the fault current generated using the process elimination approach further increase.

Therefore, there is a strong need for devices which can be utilized with the existing underground transformer loop system to simplify and speed up the process of diagnosis of fault cable or transformer failure.

SUMMARY OF THE INVENTION

In one aspect, the present invention is directed to a fused pin for adapting to an elbow terminator. The fused pin comprises an elongated arc follower section made of an electrical insulating material; an elongated fuse section comprising a hollow fuse housing portion made of an electrical insulating material, having a first open end and a rear open end; a conducting portion made of a conductive material, having a front end portion connected to the elongated arc follower section, and a rear end connected to and sealing the first open end of the hollow fuse housing portion; a fuse disposed with the hollow fuse housing portion with a front end conductively connected with the conducting portion; and an elongated cable interface section made of an electrical conductive material, including a front end connected to the rear open end of the hollow fuse housing portion and conductively connected with a rear end of the fuse, and a rear end having connection means for connecting to an elbow connector.

In a further aspect, the present invention is directed to a fused elbow terminator. The fused elbow terminator comprises an elbow connector comprising an insulating elbow shaped housing having a cable section and a bushing engagement section, and a cable connector disposed within the cable section of the housing, the cable connector having an upper end portion and a lower cable connection portion; and the fused pin of the present invention, which is connected to the upper end portion of the cable connector.

In another aspect, the present invention is directed a stage-fused transformer loop system. The system comprises a series of transformers, each of the transformers having an inlet, and an outlet; a first and a last of the series of transformers being connected to an electrical power line; a plurality of cables; each of the cables having two ends connected to the inlet of one of the transformers and the outlet of an immediately preceding transformer; and a series of fuses, each thereof having a different fuse capacity; the series of fuses being installed at each of the inlet and the outlet of the transformers in an order of sequential decrease of the fuse capacity starting from the first transformer, thereby forming the stage-fused transformer loop system.

In yet a further aspect, the present invention is directed to a method of rapid diagnosis of a fault cable or a transformer failure using the stage-fused transformer loop system. The method comprises the steps of: identifying a location of a first out-of-service transformer within the loop system, when a power outage occurs in at least a portion of the stage-fused transformer loop system; testing a fuse positioned at the inlet of the first out-of-service transformer; and if the fuse positioned at the inlet of the first out-of-service transformer is blown, reporting the diagnosis being a failure of the first out-of-service transformer; and if the fuse positioned at the inlet of the first out-of-service transformer is not blown, reporting the diagnosis being a fault cable located between the first out-of-service transformer and an immediate preceding transformer thereof.

The advantages and capabilities of the invention will become apparent from the following description taken in conjunction with the accompanying drawings showing the preferred embodiment of the invention.

BRIEF DESCRIPTION OF THE DRAWINGS

It is noted that in the drawings like numerals refer to like components.

DETAILED DESCRIPTION OF THE INVENTION

In one aspect, the present invention provides a fused pin for adapting to the existing elbow terminator used for underground transformers.

Figure 1:
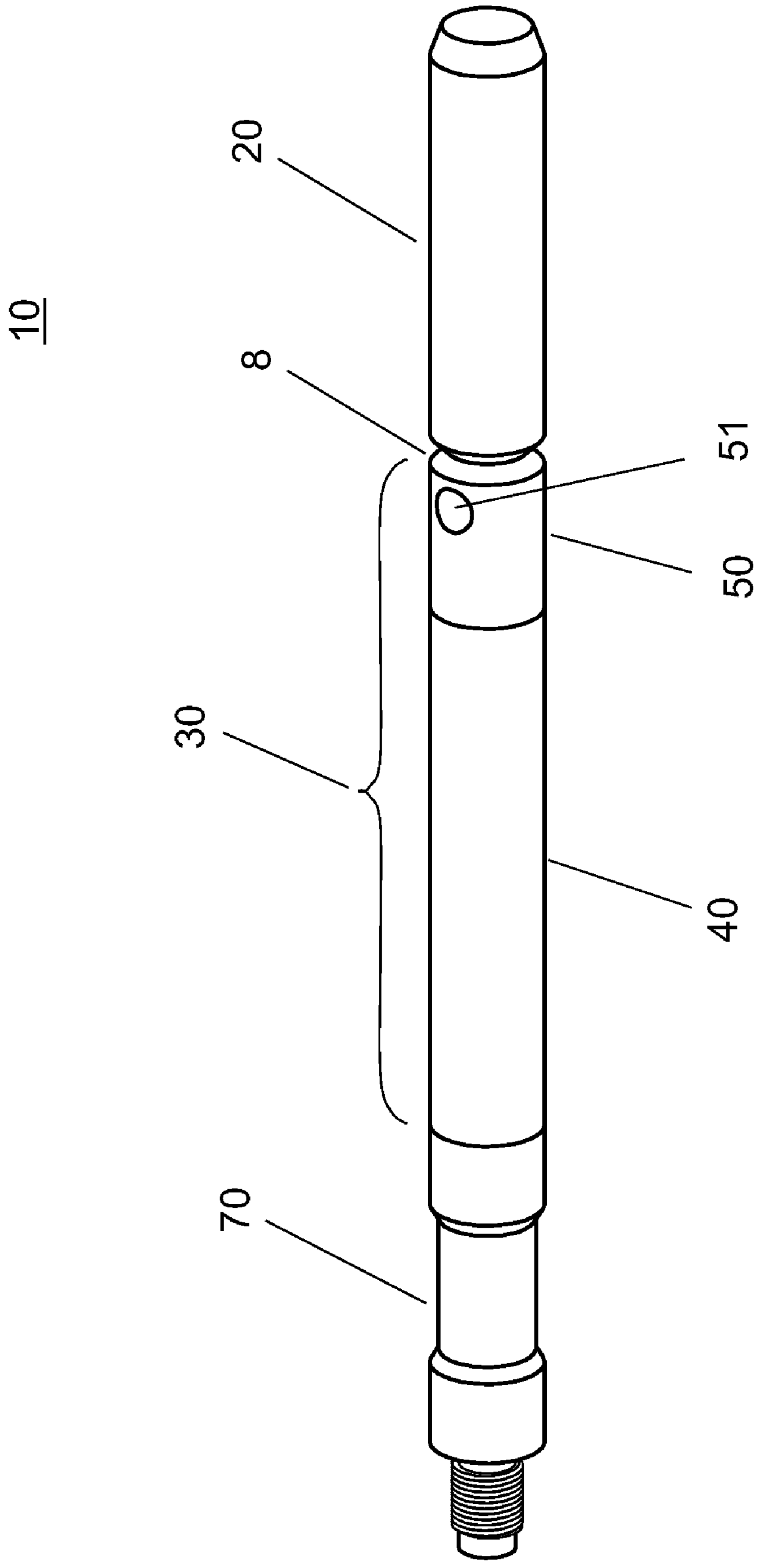
FIG. 1 is a perspective view of a fused pin of one embodiment of the present invention.
Figure 2:
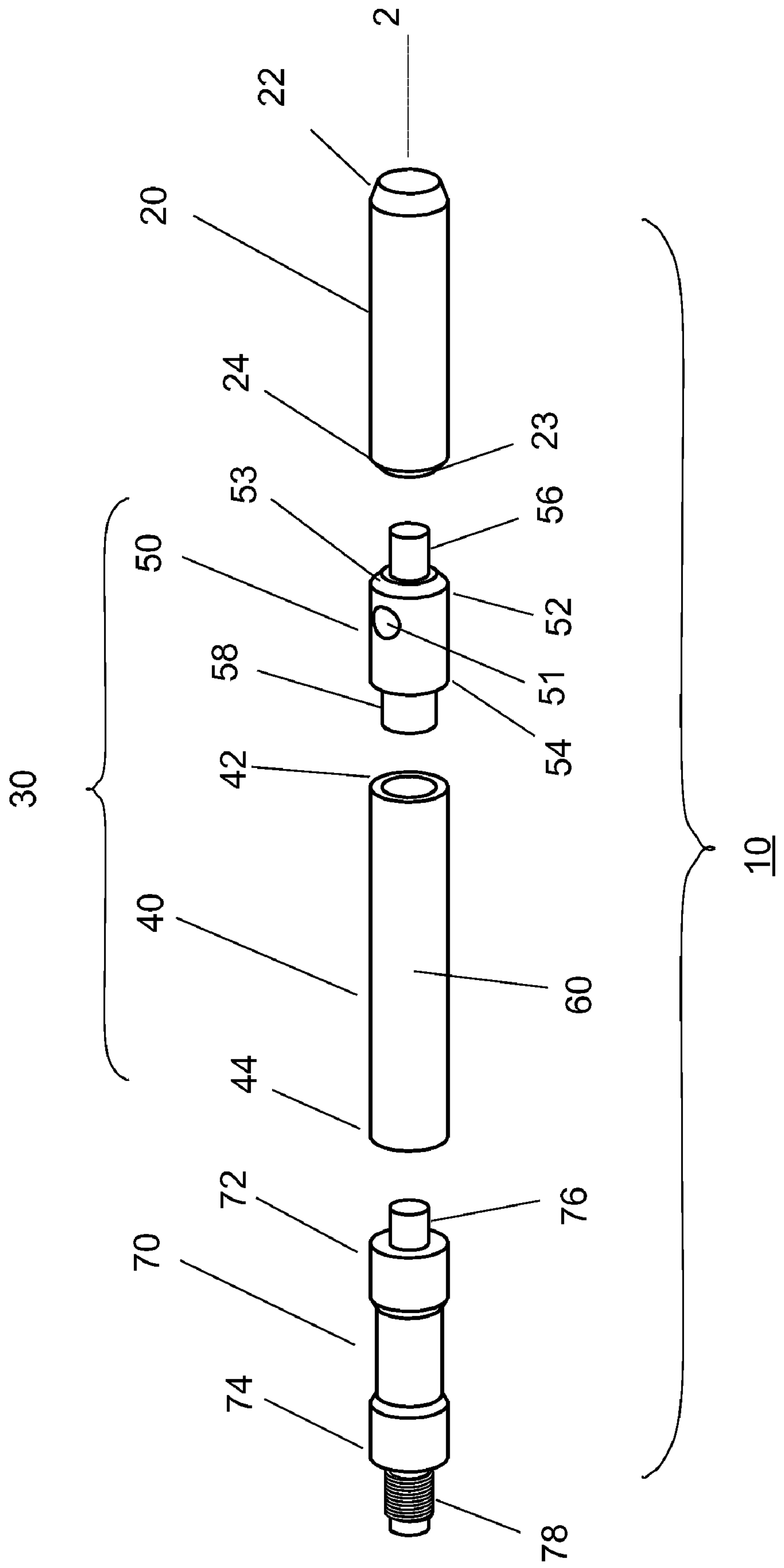
FIG. 2 is an exploded view of the fused pin of FIG. 1.
Figure 3:
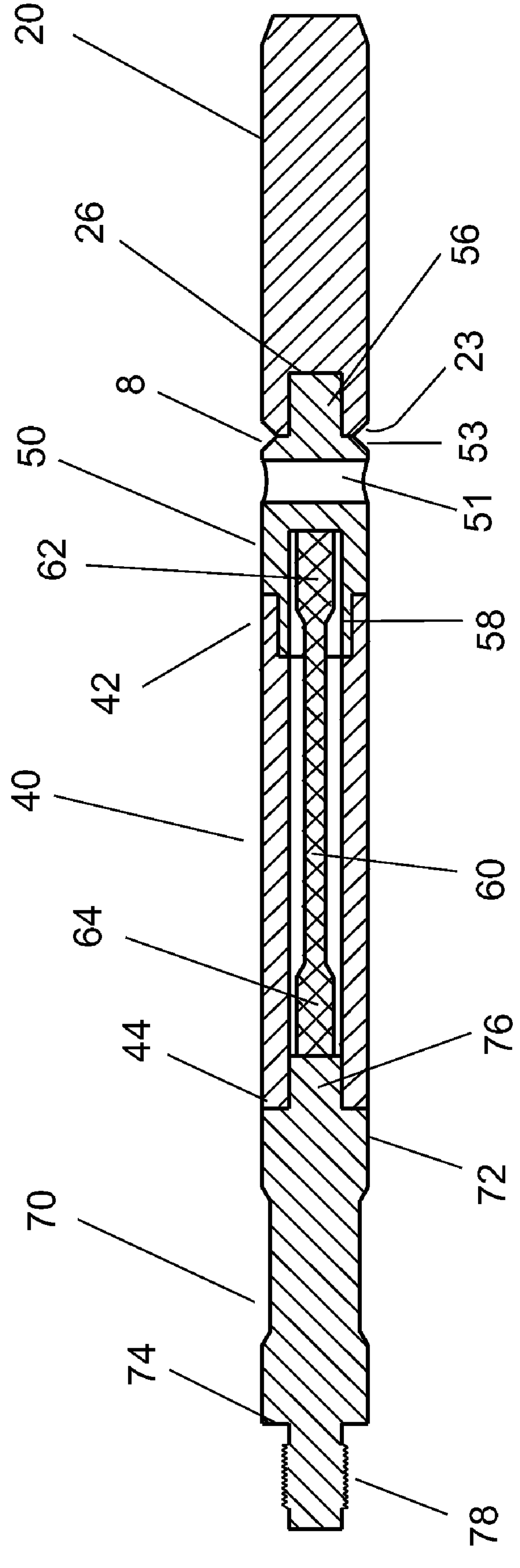
FIG. 3 is a cross-sectional view of the fused pin of FIG. 1.

In one embodiment as shown in FIGS. 1-3, fused pin 10 has a cylindrical shape, and typically has a length about 9 inches and a diameter about 0.3 inch, which can be connected to an existing elbow terminator. Fused pin 10 includes three interconnected sections, arc follower section 20, fuse section 30 and cable interface section 70.

As illustrated in FIGS. 1 to 3, arc follower section 20 has an elongated cylindrical shape, and has a front end 22 and a rear end 24. In one embodiment, rear end 24 has a recess 26 as an interface for connection with fuse section 30. Alternatively, rear end 24 can have a protrusion (not shown) as an interface for connection with fuse section 30. Other suitable connection means, such as threaded interface, can also be used for the purpose of the present invention. Arc follower section 20 is made of an electrical insulating material, and preferably the material is physically and chemically stable when exposed to heat. In a preferred embodiment, arc follower section 20 is made of ceramic. The external shape, dimension and function of arc follower section 20 are essentially the same as those of the arc follower section of the pin of existing elbow terminator. It is adaptable to the existing bushing insert installed on the transformers.

Hollow fuse housing portion 40 has a front open end 42 and a rear open end 44. Similar to arc follower section 20, hollow fuse housing portion 40 is made of an electrical insulating material. Preferably, the material is physically and chemically stable when exposed to heat. In one exemplary embodiment, hollow fuse housing portion 40 is made of ceramic.

Conducting portion 50 is made of an electrical conductive material, preferably a metal, such as copper, or a copper alloy. Front end portion 52 of conducting portion 50 has interface means 56 for connection with arc follower section 20. Preferably, interface means 56 is an integral part of conducting portion 50. In the embodiment shown in FIGS. 2 and 3, interface means 56 is a protrusion complementary to recess 26 of arc follower section 20. Alternatively, interface means 56 can be in a form of recess, to connect with a protruding interface of arc follower section 20. As shown in FIGS. 1 to 3, both front end 52 of conducting portion 50 and rear end 24 of arc follower section 20 have a chamfer 53 and 23, respectively, around the peripheries. When conducting portion 50 and arc follower section 20 are connected, chamfers 53 and 23 form a notch 8. Notch 8 is the connecting interface with the bushing insert when fused pin 10 is connected to a transformer by an elbow connector, wherein chamfer 53 conductively connects with the bushing insert. Rear end 54 of conducting portion 50 has interface means 58 for connection with front open end 42 of hollow fuse housing portion 40. When being connected, interface means 58 closes out front open end 42 of hollow fuse housing portion 40.

Figure 4:
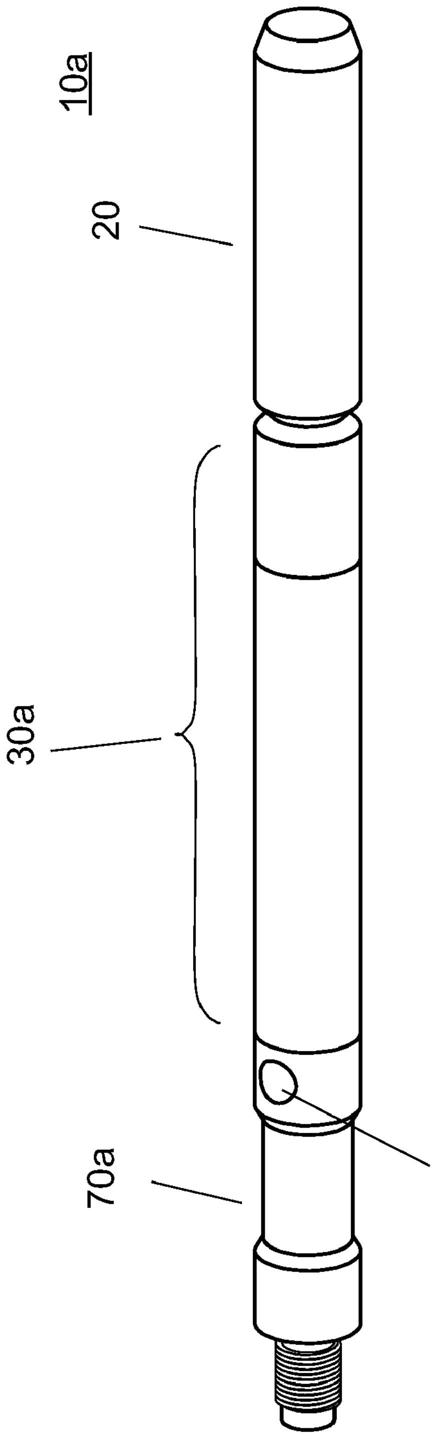
FIG. 4 is a perspective view of a fused pin of a further embodiment of the present invention, wherein the wrench hole is disposed in the cable interface section.
Figure 5:
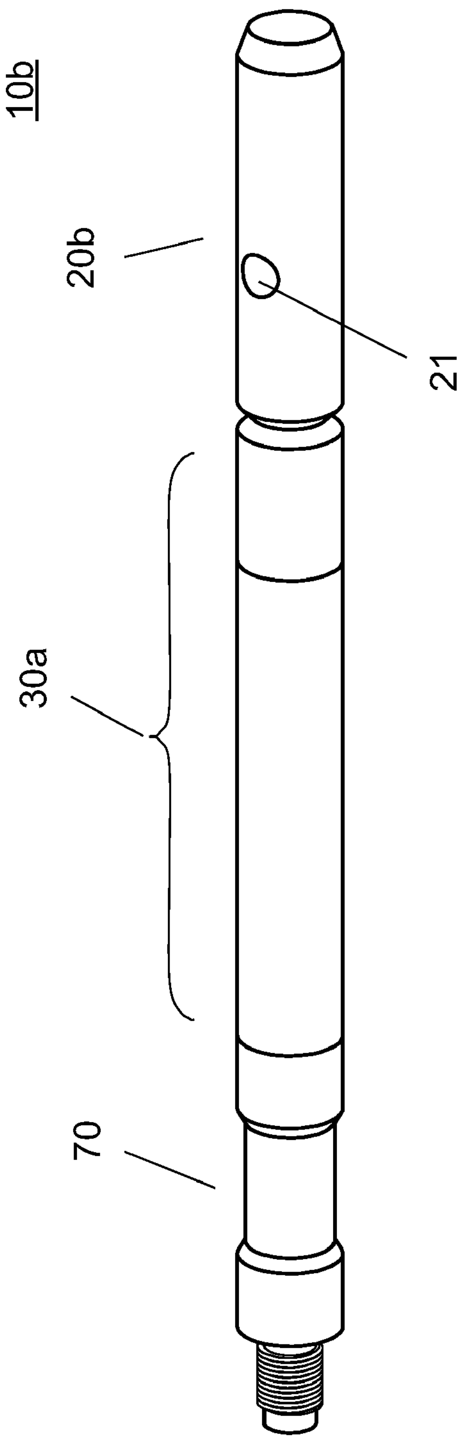
FIG. 5 is a perspective view of a fused pin of another embodiment of the present invention, wherein the wrench hole is disposed in the arc follower section.

In the embodiment shown in FIGS. 1 to 3, conducting portion 50 further includes a wrench hole 51 perpendicular to the longitudinal axis 2 of fused pin 10. Wrench hole 51 provides access to a wrench for connecting fused pin 10 to an elbow connector by a threaded connection means on cable interface section 70 as described below. Alternatively, the wrench hole can be positioned in cable interface section or arc follower section. As shown in FIG. 4, fused pin 10*a* has a wrench hole 71 positioned in cable interface section 70*a*, rather than in the fuse section 30*a*. Furthermore, as shown in FIG. 5 fused pin 10*b* has a wrench hole 21 positioned in arc follower section 20*b*, rather than in the fuse section 30*a*.

As shown in FIG. 3, Fuse 60 is housed inside hollow fuse housing portion 40. Front end 62 of fuse 60 is conductively connected to conducting portion 50, and rear end 64 of fuse 60 is conductively connected to front end 72 of cable interface section 70, respectively. Fuse 60 can be made of any known fuse material, such as lead or copper. The capacity of fuse 60 can be determined based on the voltage and amperage of the transformer loop system as described in more detail hereinafter. It is should be understood that in addition to the structure illustrated in the figures, for the present invention the fuse section can also have other suitable structures.

Cable interface section 70 is made of a conductive material, preferably a metal, such as copper, or copper alloy. Cable interface section 70 has a front end 72 connected to hollow fuse housing portion 50. As shown, front end 72 has interface means 76 complementary to rear open end 44 of the fuse housing portion 40. When being connected, front end 72 closes rear open end 44 of the fuse housing portion 40. Furthermore, interface means 76 conductively connects to rear end 64 of fuse 60. Preferably, interface means 76 is an integral part of cable interface section 70. Rear end 74 of cable interface section 70 has threaded connection means 78 for connecting to an existing elbow connector.

The combined length of fuse section 30 and cable interface section 70 is equivalent to the length of the male contact portion of the pin of existing elbow terminators. Therefore, fused pin 10 can be adapted to all existing elbow terminators.

Fused pin 10 can be provided as an integral assembly. When fuse 60 is blown during use, the electrician can simply replace the used pin by a new one. In an alternative embodiment, fused pin 10 can be provided as three separated sections. In this case, when fuse 60 is blown during use, the electrician has the option to only replace fuse section 30, instead of discarding the whole fused pin. With this embodiment, the interface means between two adjacent sections, such as 56 and 26, can be threaded interface, which provides ease for the electrician to replace components. At the interface between front end 72 of cable interface section 70 and rear open end 44 of hollow fuse housing portion 40, threaded interface means can also be provided.

Figure 6:
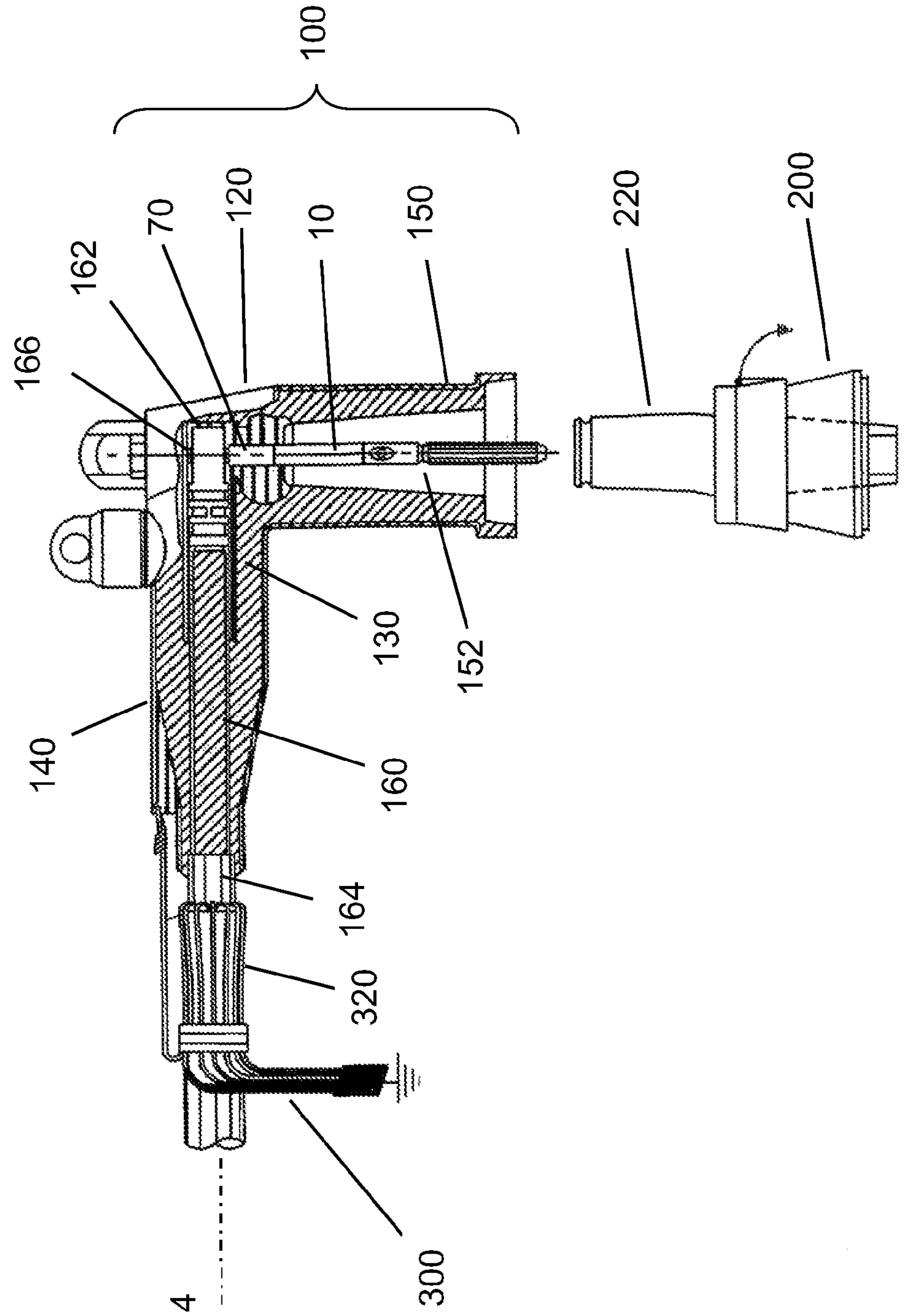
FIG. 6 is a partial cutaway view of the elbow terminator of one embodiment of the present invention.

In a further embodiment, the present invention provides a fused elbow terminator. As shown in FIG. 6, fused elbow terminator 100 comprises fused pin 10 connected to elbow connector 120. The structure of fused pin 10 has been described above. Elbow connector 120 comprises an insulating elbow shaped housing 130 which has a cable section 140 and a bushing engagement section 150, and a cable connector 160 disposed within cable section 140 of housing 130. Cable connector 160 has an upper end portion 162 and a lower cable connection portion 164. Upper end portion 162 has a threaded opening 166 perpendicular to the longitudinal axis 4 of cable connector 160 for connection with cable interface section 70 of fused pin 10. Lower cable connection portion 164 is connected to plurality of jacketed wires 320 of a cable 300. As shown, fused pin 10 is located inside jointing compartment 152 of bushing engagement section 150. Jointing compartment 152 is complementary to exterior of bushing insert 220 of bushing 200 which is mounted in a bushing well of transformer tank (not shown). Bushing 200 is electrically connected to the transformer.

Figure 7:
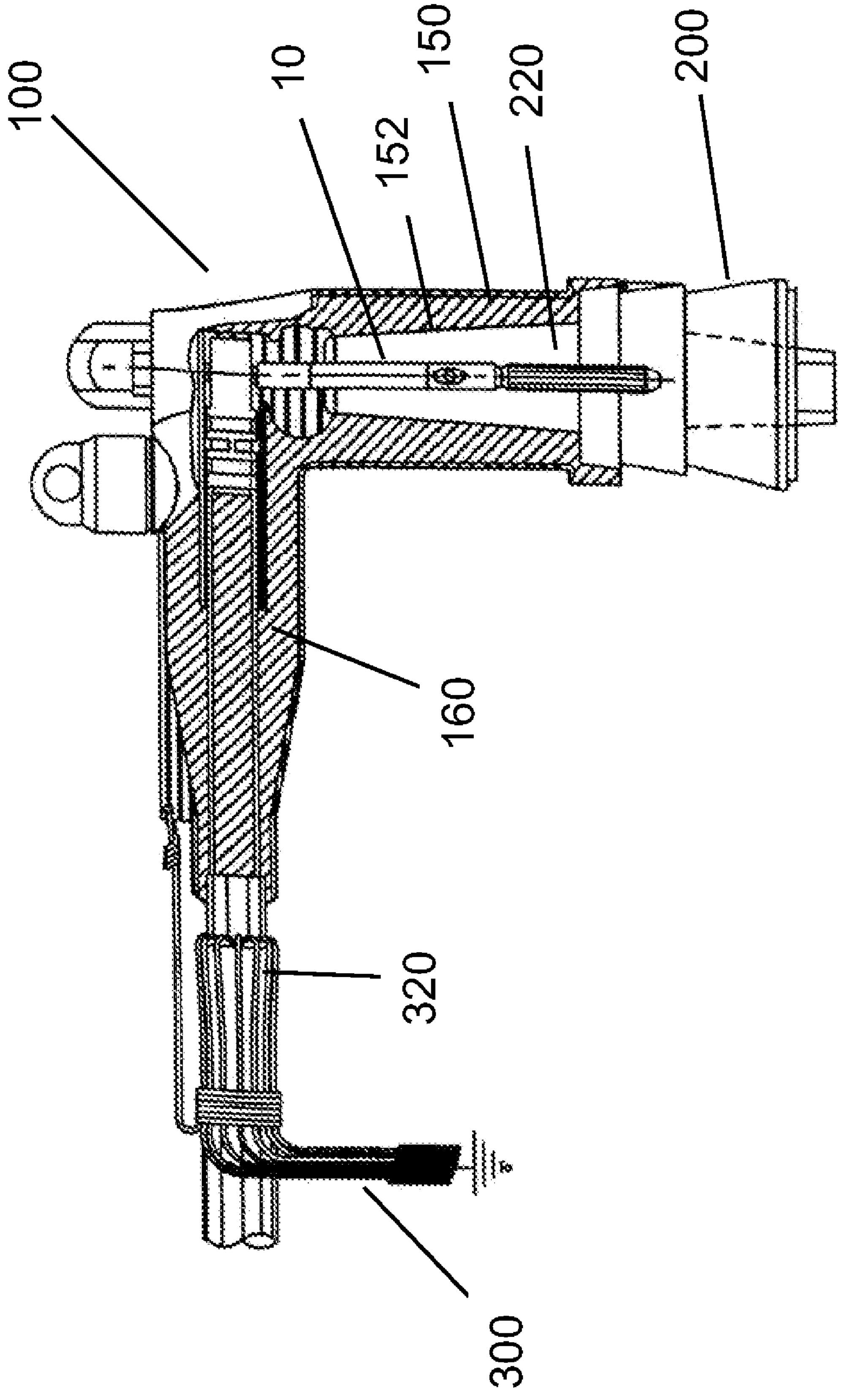
FIG. 7 is a partial cutaway view of the elbow terminator of FIG. 6, engaged with a bushing insert of a transformer.

As illustrated in FIG. 7, when in use, bushing engagement section 150 of fused elbow terminator 100 is connected to bushing 200 of a transformer, with bushing insert 220 inserted into jointing compartment 152. Upon connection, fused pin 10 is inserted into the interior of busing insert 220 and conductively connects with bushing 200. The electrical current from the transformer flows through fused pin 10 to the jacketed wires 320 of cable 300 and to the next transformer.

Figures 8, 8A:
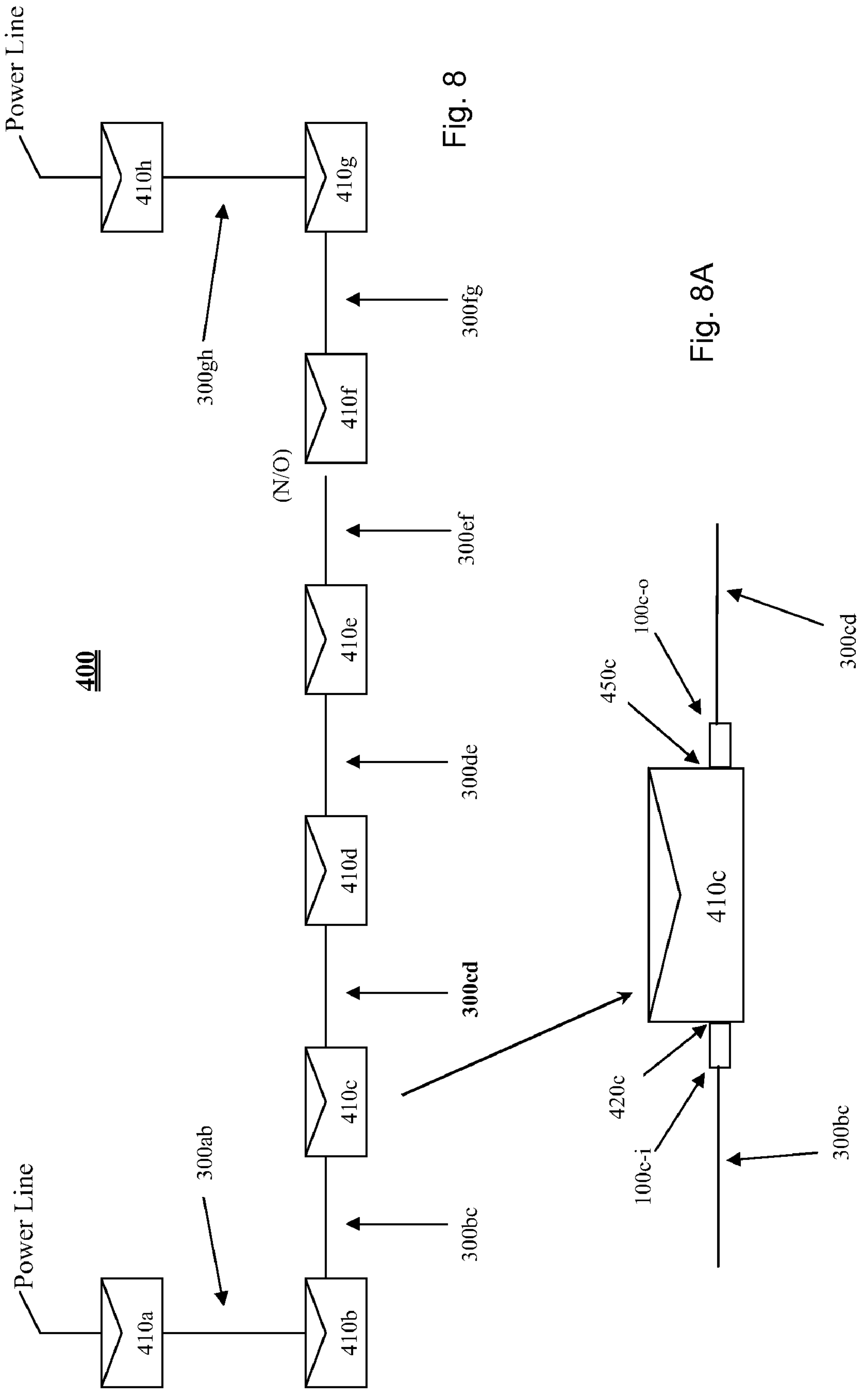
FIGS. 8 to 8A are illustrative diagrams of a stage-fused transformer loop system of the present invention.

In a further embodiment, the present invention provides a stage-fused transformer loop system 400 using the fused elbow terminator of the present invention and the method of locating a disfunctional transformer or a fault cable. As shown in FIGS. 8 and 8A, transformer loop system 400 comprises a plurality of transformers 410 (shown as 410*a* to 410*h*) sequentially connected by a plurality of cables 300 (shown as 300*ab* to 300*gh*). The first and the last transformers, 410*a* and 410*h*, are connected to a power line or other suitable electrical power supply sources. There is a normal open (N/O) within the loop, i.e., one cable is parked. The normal open can be located at any location within, typically at the middle of, the loop. Each transformer 410 has an inlet 420 and an outlet 450, each connected to a bushing 200. Transformer loop system 400 comprises a series of fused elbow terminators, each thereof having a different fuse capacity. In one embodiment, fused elbow terminator 100 described above is used in the stage-fused transformer loop system 400, wherein each fused elbow terminator 100 comprises a fused pin 10, or its alternatives. In this case, among the series of fused elbow terminators 100 the capacities of fuses 60 inside fused pins 10 are different. Each fused elbow terminator 100 is connected to transformer 400 via bushing 200 in the manner described above. The series of fused elbow terminators 100 are connected to inlets 420 and outlets 450 of transformers 410, and arranged in an order of decrease of the fuse capacity starting from the power supply source (also called feed), thereby forming a stage-fused transformer loop system.

For the convenience of description, within transformer loop system 400 the plurality of transformers 410 are further designated as 410*a* to 410*n*, wherein transformers 410*a* to 410*n* are connected to one after the other sequentially, following alphabetical, or ascending order. “n” used herein is a number representing the numbers of transformers within the closed loop system. Typically, for the underground transformer system for residential and industrial power supply, n can be from about 8 to about 30. Inlet 420 and outlet 450 are also designated by the specific transformer within the loop system, such as 420*a* and 450*a* are the inlet and outlet of transformer 410*a*, respectively. Similarly, fused elbow terminators are designated according to the corresponding transformers to which they connect. For example, fused elbow terminator 100*a-i* connects to inlet 420*a* of transformer 410*a*, and fused elbow terminator 100*a-o* connects to outlet 450*a* of transformer 410*a*. Moreover, the plurality of cables 300 are further designated as 300*ab* to 300*n*(n+1). Using this designation, cable 300*ab* is located between transformers 410*a* and 410*b*, and cable 300*n*(n+1) is located between transformers 410*n* and 410(n+1). Furthermore, for the ease of description, each cable 300 has an inlet end which connects to inlet 420 of a transformer 410*n* and an outlet end which connects to outlet 450 of an immediate preceding transformer 410(n−1).

Figure 9:
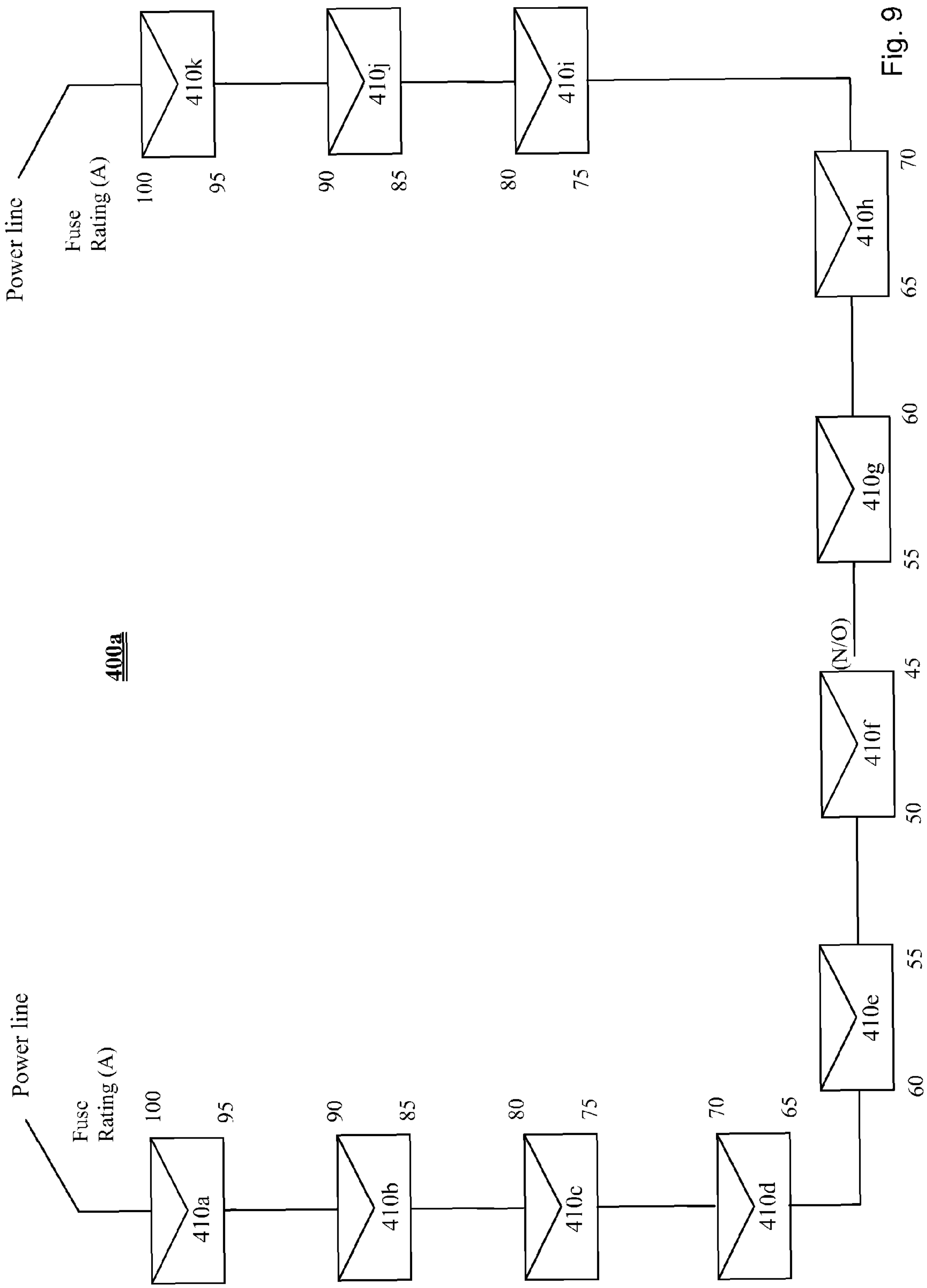
FIG. 9 illustrates an example of the staged fuse arrangement within a stage-fused transformer loop system of the present invention.

The fuse capacities of the fused pins can be determined based on the primary amperage of the loop system, which can be readily determined by those having ordinary skill in the art. FIG. 9 illustrates an example of staged fuse arrangement in the transformer loop system. In this stage-fused transformer loop system 400*a*, there are eleven (11) transformers 410*a* to 410*k* and the normal open is located at 410*f*. The fuse rating in amperage (A) for each fuse at the inlet and the outlet of the transformer is shown next to the transformer. For example, the fuses at inlet 420*c* and outlet 450*c* of transformer 410*c* are rated for 80 A and 75 A, respectively.

In the stage-fused transformer loop system 400*a*, the fuses are arranged in an order of decreasing fuse capacity from the feed to the normal open. In the example shown in FIG. 9, the fuses placed at the inlet and the outlet of transformer 410*a*, preferably in the fused elbow terminators 100*a-i* and 100*a-o*, are rated for 100 A and 95A, respectively, and the fuses placed at the inlet and the outlet of transformer 410*b*, preferably in the fused elbow terminators 100*b-i* and 100*b-o*, are rated for 90 A and 85A, respectively. In this descending order, the fuses in the first half of the loop system, from transformer 410*a* which is connected to the power line to transformer 410*f* at the normal open, are rated for 100 A, 95 A, 90 A, 85 A, 80 A, 75 A, 70 A, 65 A, 60 A, 55 A, 50 A and 45 A, respectively. As shown, in the second half of the loop system, from transformer 410*k* which is connected to the power line to transformer 410*g* next to the normal open, the fuses are arranged in a similar descending order.

As can be appreciated, using the stage-fused transformer loop system the distance that the fault current travels is substantially reduced. Assume a fault current starts in the transformer 410*e*, since the fault current travels back toward the feed, the fault current will blow the fuse at the inlet of transformer 410*e*. As such, the fault current does not go through transformers 410*d*, 410*c*, 410*b* and 410*a*. Therefore, the potential damages to transformers 410*d* to 410*a* and the cables in this section are substantially reduced. In comparison, in the existing transformer loop system if the fault current starts in transformer 410*e*, it travels all the way back to the lateral switch between the power line and transformer 410*a*, and blows the fuse in the lateral switch. In this situation, the entire section of the loop from transformer 410*e* to the feed experiences high risks of damage due to the fault current.

Figure 10:
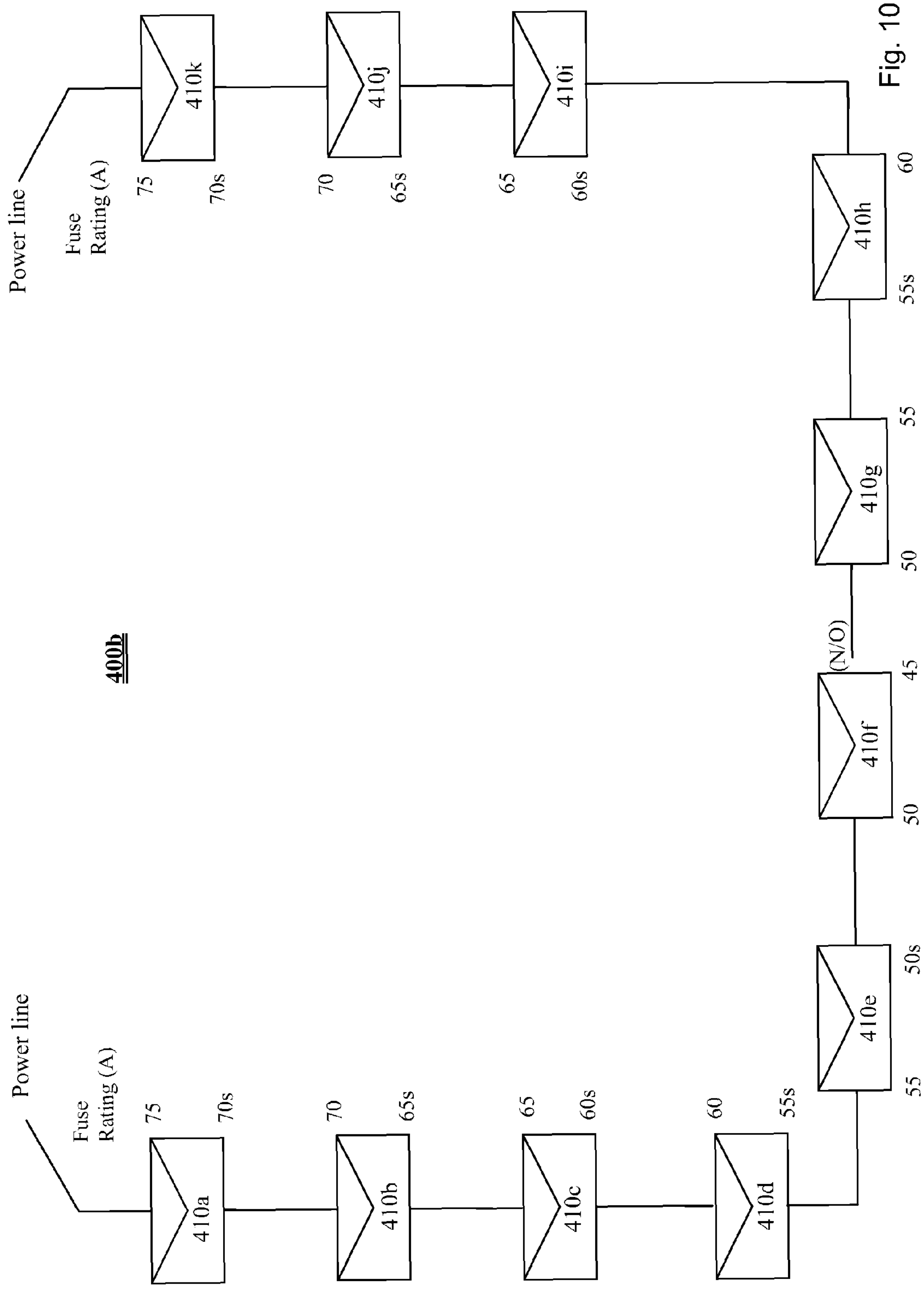
FIG. 10 illustrates another example of the staged fuse arrangement within a stage-fused transformer loop system of the present invention.

In a further embodiment, the stage-fused transformer loop system further incorporates time delayed fusing to minimize the distance that the fault current travels. It is noted that the time delayed fuse is known and commonly used in the art. FIG. 10 illustrates an example of the fuse arrangement in such a transformer loop system, and preferably the fuses are placed in the fused elbow terminators connected to both inlet and outlet of the transformers.

In FIG. 10, the stage-fused transformer loop system 400*b* has the same transformers as the stage-fused transformer loop system 400*a* shown in FIG. 9, yet the fuse arrangement is different. As shown, in the first half of the loop system, from transformer 410*a* to transformer 410*f*, the fuses at the inlet of the transformers are arranged in a descending order. In this example, the fuses at the inlets of transformers 410*a* to 410*f* are rated for 75 A, 70 A, 65 A, 60 A, 55 A, and 50 A, respectively. The fuse capacity of the fuses at the outlet of a transformer and the inlet of immediate succeeding transformer is the same. For example, the fuses at the outlet of transformer 410*a* and the inlet of transformer 410*b* are both rated for 70 A. However, time delay of these two fuses is different. The fuse at the inlet of transformer 410*b* has a shorter time delay, in other words, it responds to the fault current faster, hence it is commonly referred to as fast blown fuse. The fuse at the outlet of transformer 410*a* has a longer time delay, in other words, it responds to the fault current slower, hence it is commonly referred to as slow blown fuse and it is labeled with a "s", for example, 70*s* as shown next to transformer 410*a*, and 65*s* next to transformer 410*b*, and so on. Now assume again that the fault current starts in the transformer 410*e*, since the fuse at the inlet of transformer 410*e* responds faster than the fuse at the outlet of transformer 410*d*, the fault current blows the fuse at the inlet of transformer 410*e*. Therefore, the fault current does not go through transformers 410*d*, 410*c*, 410*b* and 410*a*.

It should be understood that although stage-fused transformer loop system 400 is described herein using fused elbow terminator 100, other suitable means for providing staged fuses to a transformer loop can also be used for the purpose of the present invention, such as installing a fuse at the inlet and a fuse at the outlet of each transformer of the system, respectively, and arranging the fuses in an order of decrease of the fuse capacity from the feed.

The operating mechanism of stage-fused transformer loop system 400 and the method of diagnosis of a fault cable or a transformer failure when a power outage occurs within the stage-fused transformer loop system are described hereinafter in reference to FIG. 8. The term "transformer failure" used herein refers to a problem associated with a transformer, which causes the power outage. Such a problem includes worn out transformer components, dysfunction, or simply the fuse of the transformer being blown by the overload current. On the other hand, the term "out-of-service transformer" used hereinafter refers to a transformer that stops supplying power, but may or may not have a transformer failure. Not supplying power could be caused by losing its own power supply by a fault cable between the power source and the out-of-service transformer, or by a failed transformer preceding the out-of-service transformer within the loop system. In other words, the out-of-service transformer could be completely normal and functional, and merely lose its power supply because of problems occurring with cable(s) or other transformer(s) of the loop system.

In a working example, stage-fused transformer loop system 400 has eight (8) transformers 410*a* to 410*h* sequentially connected to one after the other, and sixteen (16) fused elbow terminators 100 are connected to inlets 420 and outlets 450 of the transformers. The fuse capacities of the fused elbow terminators can be equivalent to those described above in the example shown in FIG. 9 or FIG. 10. Within transformer loop system 400, transformer 410*a* and 410*h* are connected to an overhead power line, and the normal open is positioned at transformer 410*f*. Assume the problem is a fault cable 300*cd* between transformers 410*c* and 410*d*, as shown in FIG. 8. Because fault current travels backward toward the feed, fused pin in fused elbow terminator 100*c-o* will be blown, so the fault current does not go through 410*c*, nor the transformers preceding 410*c*, in this case, 410*b* and 410*a*. As the problem occurs, within the stage-fused transformer loop system customers supplied by transformers 410*d* to 410*e* have power outage, but customers supplied by transformers 410*a* to 410*c*, as well as those supplied by transformers 410*f* to 410*h* (which are on the other side of normal open) will still have power. As customers supplied by transformers 410*d* to 410*e* call in to report power outage, the assigned trouble investigator in the field responds, and as the first step of the actions, the investigator determines the location of the fault cable or transformer failure. Because the power outage starts from transformer 410*d*, the investigator can rapidly determine that the problem is either transformer 410*d* or fault cable 300*cd*. This process step can typically take about 10-15 minutes. If a large numbers of customers called in, the dispatch can also assist in determining the location of the problem based on the information on the computer system. Then, in the second step the investigator determines whether the problem is transformer 410*d* or cable 300*cd*. The investigator tests fused elbow terminator 100*d-i*, if the fuse is not blown, the problem is cable 300*cd*, not transformer. The investigator disconnects 300*cd* from inlet 420*d* of transformer 410*d*, at this point reports the findings to dispatch. This step typically takes about 5 minutes. Then the investigator goes to transformer 410*c*, confirms that transformer 410*c* is working, and disconnects cable 300*cd* from the active transformer 410*c*. This step typically takes about 15-20 minutes. Prior to repairing cable 300*cd*, the Investigator goes to the normal open at transformer 410*f* to close the normal open, i.e., electrically connects cable 300*ef* to transformer 410*e*, which restores power to customers supplied by transformers 410*e* and 410*d*. This step typically takes about 10-15 minutes. During the repairing of cable 300*cd* all customers in transformer loop system 400 have power supply. After the repairing, fuse pin in fused elbow terminator 100*c-o* is replaced, and cable 300*cd* is reconnected to transformers 410*c* and 410*d*. The normal open is opened again, and regular power supply is resumed.

In a different scenario of this example, in the second step described above if the investigator finds that the fuse in fused elbow terminator 100*d-i* is blown, the problem is transformer 410*d*. In this case, cable 300*de* will be disconnected from transformer 410*d* and the normal open will be closed to restore power to transformer 410*e*, prior to repairing transformer 410*d*.

Based on the above description, it can be appreciated immediately that using stage-fused transformer loop system 400, the process of diagnosis of a fault cable or a transformer failure, and restoring power supply to the loop system is significantly faster and simpler than the diagnosis process of the existing transformer loop system, which is described in the Background of the Invention. More specifically, diagnosing a fault cable in stage-fused transformer loop system 400 as described in the above example and restoring the power supply prior to repairing the cable take totally about 40 to 55 minutes. In an existing transformer system having same numbers of transformers, the diagnosis for the same cable failure typically takes about 2 to 4 hours, if all fault indicators function properly.

Several major advantages of the instant stage-fused loop system can be recognized. First, because the fused elbow terminators are connected to both inlets and outlets of the transformers, the distance that the fault current travels reduces substantially, which reduces the potential damages to multiple transformers or cables. Second, the investigator no longer needs to use process elimination approach in locating the fault cable or failed transformer. Therefore, the investigator does not need to close lateral switch to test a section of the loop, which continuously generates fault current, and poses further risks to that section. Furthermore, the investigator does not need to drive between the lateral switch and the transformers, and among the transformers, which saves a substantial amount of time. Third, the investigator can operate independently in the field, without relying on the dispatch's assistance, which further reduces time in communication, particularly when the dispatch is overloaded by other service calls.

The substantial saving in the time of diagnosis and restoring power with the instant stage-fused transformer loop system reduces customer inconvenience and business financial loss due to power outage.

The invention has been described with reference to particularly preferred embodiments. It will be appreciated, however, that various changes can be made without departing from the spirit of the invention, and such changes are intended to fall within the scope of the appended claims. While the present invention has been described in detail and pictorially shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents. All patents and other publications cited herein are expressly incorporated by reference.

I claim:

1. A method of rapid diagnosis of a fault cable or a transformer failure in a stage-fused transformer loop system comprising:

(a) providing said stage-fused transformer loop system comprising a plurality of transformers serially connected by a plurality of cables, each of said transformers having an inlet and an outlet; a first and a last of said serially connected transformers being connected to an electrical power supply source; each of said cables having two ends connected to said inlet of one of said transformers and said outlet of an immediately preceding transformer, respectively; and a series of fuses installed at each of said inlet and said outlet of said transformers in an order of decreasing fuse capacity starting from said first transformer, thereby forming said stage-fused transformer loop system; wherein said fuse is disposed in a fused pin of a fused elbow terminator connected to said inlet or said outlet of said each transformer of said stage-fused transformer loop system;

(b) when a power outage occurs in at least a portion of said stage-fused transformer loop system, identifying a location of a first out-of-service transformer within said loop system;

(c) then, testing one of said fuses positioned at said inlet of said first out-of-service transformer, including disconnecting said fused elbow terminator from said first out-of-service transformer and testing said fuse in said elbow terminator; and (d) if said fuse positioned at said inlet of said first out-of-service transformer is blown, reporting said diagnosis being a failure of said first out-of-service transformer; and if said fuse positioned at said inlet of said first out-of-service transformer is not blown, reporting said diagnosis being a fault cable located between said first out-of-service transformer and an immediate preceding transformer thereof.

2. The method of claim 1, wherein said fuse capacity of one of said fuses placed at said inlet of one of said transformers is equal to or less than said fuse capacity of one of said fuses placed at said outlet of immediate preceding transformer.

3. The method of claim 1, wherein said stage-fused transformer loop system further comprises a normal open located about a middle of said stage-fused transformer loop system.

4. A stage-fused transformer loop system comprising:

(a) a plurality of transformers serially connected by a plurality of cables, each of said transformers having an inlet and an outlet; a first and a last of said serially connected transformers being connected to an electrical power supply source; each of said cables having two ends connected to said inlet of one of said transformers and said outlet of an immediately preceding transformer, respectively; and (b) a series of fuses installed at each of said inlet and said outlet of said transformers in an order of decreasing fuse capacity starting from said first transformer, thereby forming said stage-fused transformer loop system; each of said fuses being disposed in a fused pin of a fused elbow terminator connecting to said inlet or said outlet of each of said transformers; and said fused elbow terminator comprises:

an elbow connector comprising an insulating elbow shaped housing having a cable section and a bushing engagement section at an angle to said cable section, and a cable connector disposed within said cable section of said housing, said cable connector having an upper end portion and a lower cable connection portion; and a fused pin disposed within said bushing engagement section, said fused pin comprising:

an elongated arc follower section made of an electrical insulating material;

an elongated fuse section comprising a hollow fuse housing portion made of an electrical insulating material, having a front open end and a rear open end; a conducting portion made of an electrical conductive material, having a front end portion connected to said elongated arc follower section, and a rear end connected to and sealing said front open end of said hollow fuse housing portion; a fuse disposed with said hollow fuse housing portion with a front end conductively connected with said conducting portion; and an elongated cable interface section made of an electrical conductive material, including a front end connected to said rear open end of said hollow fuse housing portion and conductively connected with a rear end of said fuse, and a rear end having connection means connected to said upper end portion of said cable connector of said cable section.

5. The stage-fused transformer loop system of claim 4, wherein said fuse capacity of one of said fuses placed at said inlet of one of said transformers is equal to or less than said fuse capacity of one of said fuses placed at said outlet of immediate preceding transformer.

6. The stage-fused transformer loop system of claim 4 further comprising a normal open located about a middle of said stage-fused transformer loop system.

7. A method of rapid diagnosis of a fault cable or a transformer failure in a stage-fused transformer loop system comprising:

(a) providing said stage-fused transformer loop system of claim 4;

(b) when a power outage occurs in at least a portion of said stage-fused transformer loop system, identifying a location of a first out-of-service transformer within said loop system;

(c) then, testing one of said fuses positioned at said inlet of said first out-of-service transformer; and (d) if said fuse positioned at said inlet of said first out-of-service transformer is blown, reporting said diagnosis being a failure of said first out-of-service transformer; and if said fuse positioned at said inlet of said first out-of-service transformer is not blown, reporting said diagnosis being a fault cable located between said first out-of-service transformer and an immediate preceding transformer thereof.

8. The method of claim 7, wherein in (c) said testing includes disconnecting said fused elbow terminator from said first out-of-service transformer, and testing said fuse in said elbow terminator.

9. A method of rapid diagnosis of a fault cable or a transformer failure in a stage-fused transformer loop system comprising:

(a) providing said stage-fused transformer loop system comprising:

a plurality of transformers serially connected by a plurality of cables, each of said transformers having an inlet and an outlet; a first and a last of said serially connected transformers being connected to an electrical power supply source; each of said cables having two ends connected to said inlet of one of said transformers and said outlet of an immediately preceding transformer, respectively; and a series of fuses installed at each of said inlet and said outlet of said transformers in an order of decreasing fuse capacity starting from said first transformer, thereby forming said stage-fused transformer loop system; said fuse being disposed in a fused pin of a fused elbow terminator connected to said inlet or said outlet of said each transformer of said stage-fused transformer loop system;

(b) when a power outage occurs in at least a portion of said stage-fused transformer loop system, identifying a location of a first out-of-service transformer within said loop system;

(c) then, testing one of said fuses positioned at said inlet of said first out-of-service transformer, including disconnecting said fused elbow terminator from said first out-of-service transformer and testing said fuse in said elbow terminator; and (d) if said fuse positioned at said inlet of said first out-of-service transformer is blown, reporting said diagnosis being a failure of said first out-of-service transformer; and if said fuse positioned at said inlet of said first out-of-service transformer is not blown, reporting said diagnosis being a fault cable located between said first out-of-service transformer and an immediate preceding transformer thereof.

10. The method of claim 9, wherein said fuse capacity of one of said fuses placed at said inlet of one of said transformers is equal to or less than said fuse capacity of one of said fuses placed at said outlet of immediate preceding transformer.

11. The method of claim 9, wherein said stage-fused transformer loop system further comprises a normal open located about a middle of said stage-fused transformer loop system.

* * * * *